J. PFEIFER.

COAL-SCUTTLE.

No. 6,898. Reissued Feb. 1, 1876.

Witnesses:

Ben Morrison

Wm. H. Morrison,

Inventor:

John Pfeifer.

N. PETERS, PHOTO-LITHOGRAPHER, WASHINGTON, D. C.

UNITED STATES PATENT OFFICE.

JOHN PFEIFER, OF PHILADELPHIA, PENNSYLVANIA.

IMPROVEMENT IN COAL-SCUTTLES.

Specification forming part of Letters Patent No. 61,356, dated January 22, 1867; reissue No. 6,898, dated February 1, 1876; application filed December 24, 1875.

*To all whom it may concern:*

Be it known that I, JOHN PFEIFER, of the city of Philadelphia, in the State of Pennsylvania, have invented a new and useful Improvement in the Manufacture of Coal-Scuttles and other sheet-metal vessels requiring the bottom and foot flange thereof to be stamped or formed up together in a single piece of sheet metal, and afterward attached to the body of the vessel.

In the manufacture of coal-scuttles and other vessels requiring the bottom and foot to be stamped or formed up together in a single piece of sheet metal, as above stated, it has, previously to my invention herein described, been found impracticable, without too much cost of time and labor, to make a sufficiently close-fitting joint between the said body of the vessel and the said bottom thereof; and the object of my improvement is to remedy this defect.

My invention consists of a concavo-convex bead produced around that part of the vessel where the lower edge of the body overlaps the upper part of the flanged bottom, substantially as will be described herein with reference to the accompanying drawings, in which—

Figure 1:
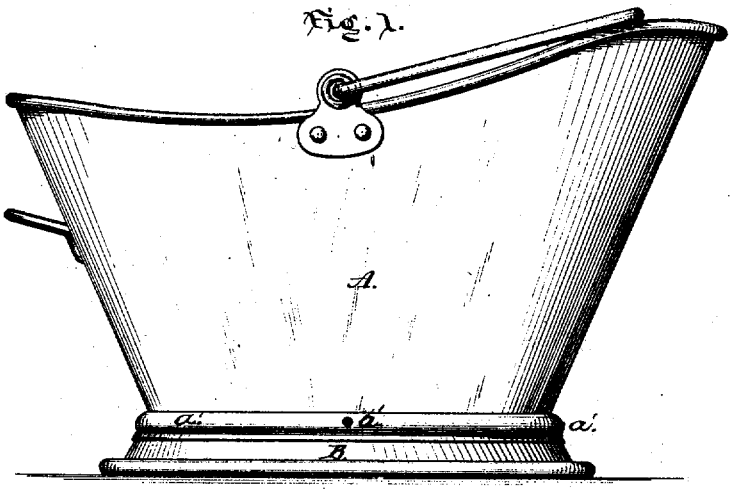
Figure 2:
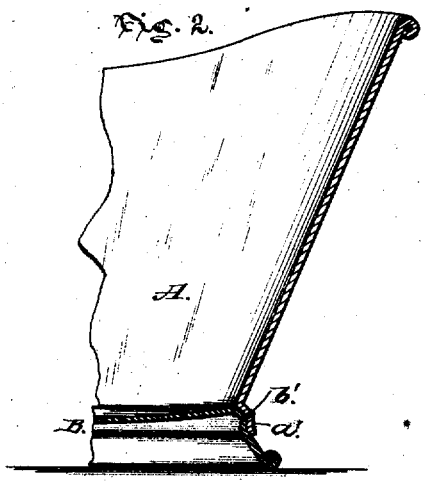

Figure 1 is a side view of a coal-scuttle embodying my invention, and Fig. 2 a vertical longitudinal section of the spout end of said scuttle.

The body A has the edge of its open lower end flared outward, so as to fit over the outside of the upper portion of the foot-flange of the bottom B, the said flange flaring outward to correspond with the flare given to the lower edge of the body A. The flared lower edge of the body is then forced over upon the upper part of the flared bottom B, so that the flared portion of A will fit tightly and accurately around over the upper portion of B. The lapping portions of the body A and bottom B are now pressed closely and durably or inseparably together, between any suitable pair of beading-rolls, so as to produce a concavo-convex bead, *a'*, around between the body and foot, substantially as shown in the drawings. The vessel is finally painted or japanned, as the particular use of the same may require, and the joint or bead which connects A and B together will be, and remain, perfectly water-tight, which is the condition required. Three or four small rivets, *b'*, are inserted to hold the two parts, A and B, together, while the bead *a'* is being formed between the rolls.

It will be seen that the construction of my invention is simple and inexpensive, and that it will be perfectly effective for the purpose.

I do not claim a beaded head or bottom forced into the end of a correspondingly-beaded cylinder of a less diameter; but

I claim as my invention—

The concavo-convex bead *a'* constructed and applied substantially as and for the purpose hereinbefore set forth and described.

JOHN PFEIFER.

Witnesses:

BENJ. MORISON,

WM. H. MORISON.